ively measuring the gloss of thin essentially trans-
United States Patent
Kottle et al.

[15] 3,690,774
[45] Sept. 12, 1972

[54] CONTINUOUS OPTICAL QUALITY CONTROL MONITOR

[72] Inventors: Sherman Kottle, Lake Jackson, Tex. 77566; William P. Carl; Walter L. Vaughn, both of Angleton, Tex. 77515

[73] Assignee: The Dow Chemical Company, Midland, Mich.

[22] Filed: Feb. 26, 1971

[21] Appl. No.: 119,214

[52] U.S. Cl. ............... 356/206, 356/201, 356/204, 356/209, 356/239, 250/219
[51] Int. Cl. ............................................. G01n 21/30
[58] Field of Search...... 356/206, 210, 209, 201, 239, 356/93, 204; 250/219 S

[56] References Cited

UNITED STATES PATENTS

| | | | |
|---|---|---|---|
| 2,427,013 | 9/1947 | MacAdams | 356/206 |
| 2,720,812 | 10/1955 | Middleton | 356/210 X |
| 2,939,361 | 6/1960 | Hock | 356/206 |
| 3,202,826 | 8/1965 | Greathouse | 356/206 X |
| 3,340,764 | 9/1967 | Bergson | 356/206 X |
| 3,490,849 | 1/1970 | Hambleton | 356/206 X |
| 3,526,460 | 9/1970 | Webb | 356/206 X |
| 3,544,222 | 12/1970 | Jannasch et al | 356/206 X |
| 3,222,978 | 12/1965 | Dreyfus | 356/93 |
| 3,527,541 | 9/1970 | Boughner | 356/239 |

OTHER PUBLICATIONS

The British Ink Maker Nov. 1966 pp 31– 35 " A Direct-Reading Tristimulus Colorimeter" by Hambleton Primary Examiner—John S. Heyman
Attorney—Griswold & Burdick and Earl D. Ayers

[57] ABSTRACT

This invention relates to an instrument for continuously measuring the gloss of thin essentially transparent plastic films as the film is in the light path of the instrument. The instrument uses a beam of visible light directed through the film in such a manner that the transmitted intensity is a measure of the gloss of the film. This device makes lengthy laboratory testing of film optical properties unnecessary because the measurement can be made as the film is being fabricated.

7 Claims, 3 Drawing Figures

3,690,774

CONTINUOUS OPTICAL QUALITY CONTROL MONITOR

BACKGROUND OF THE INVENTION

This invention relates to an instrument for measuring characteristics of thin essentially transparent plastic films and particularly to an instrument for measuring the gloss of such film during fabrication of the film.

In known art, a reflectance measurement is made in the laboratory after the film is fabricated. Typically, samples must be selected, carefully cut and mounted and multiple measurements must be made and treated numerically to determine the gloss of the film. Such procedure results in a long delay between fabrication and analysis; and multiple analyses are necessary.

Accordingly, a principal object of this invention is to provide an improved apparatus for measuring the gloss of thin, essentially transparent plastic films.

Another object of this invention is to provide an improved apparatus for continuously measuring the gloss of thin, essentially transparent plastic films.

A further object of this invention is to provide an improved, simple to operate, portable apparatus for continuously measuring the gloss of thin, essentially transparent plastic films.

In accordance with this invention, there is provided apparatus in which the thin, essentially transparent film passes through an optical path wherein a beam of visible light is directed through the film in such a manner that the transmitted intensity is a measure of the gloss of the film.

The apparatus operates on the proven premise that a measurement of transmitted light over a very narrow acceptance angle can be related to the specular gloss of a film specimen. The instrument will operate on both cast or tubular plastic films though the calibration curves are different for the two types.

As the product passes through the optical path, any local differences in the film will result in a deviation of the incident beam intensity from the level appropriate to the thickness, refractive index and surface properties of the foregoing location. A reference beam may be employed to make the output from a photocell bridge a true measure of optical differences. Standardization can be made at zero per cent by blocking the light beam by means of an opaque object and 100 per cent transmittance by having only air in the path of the light beam and then any portion of the scale can be expanded.

The invention, as well as additional objects and advantages thereof, will best be understood when the following detailed description is read in connection with the accompanying drawing, in which.

Figure 1:
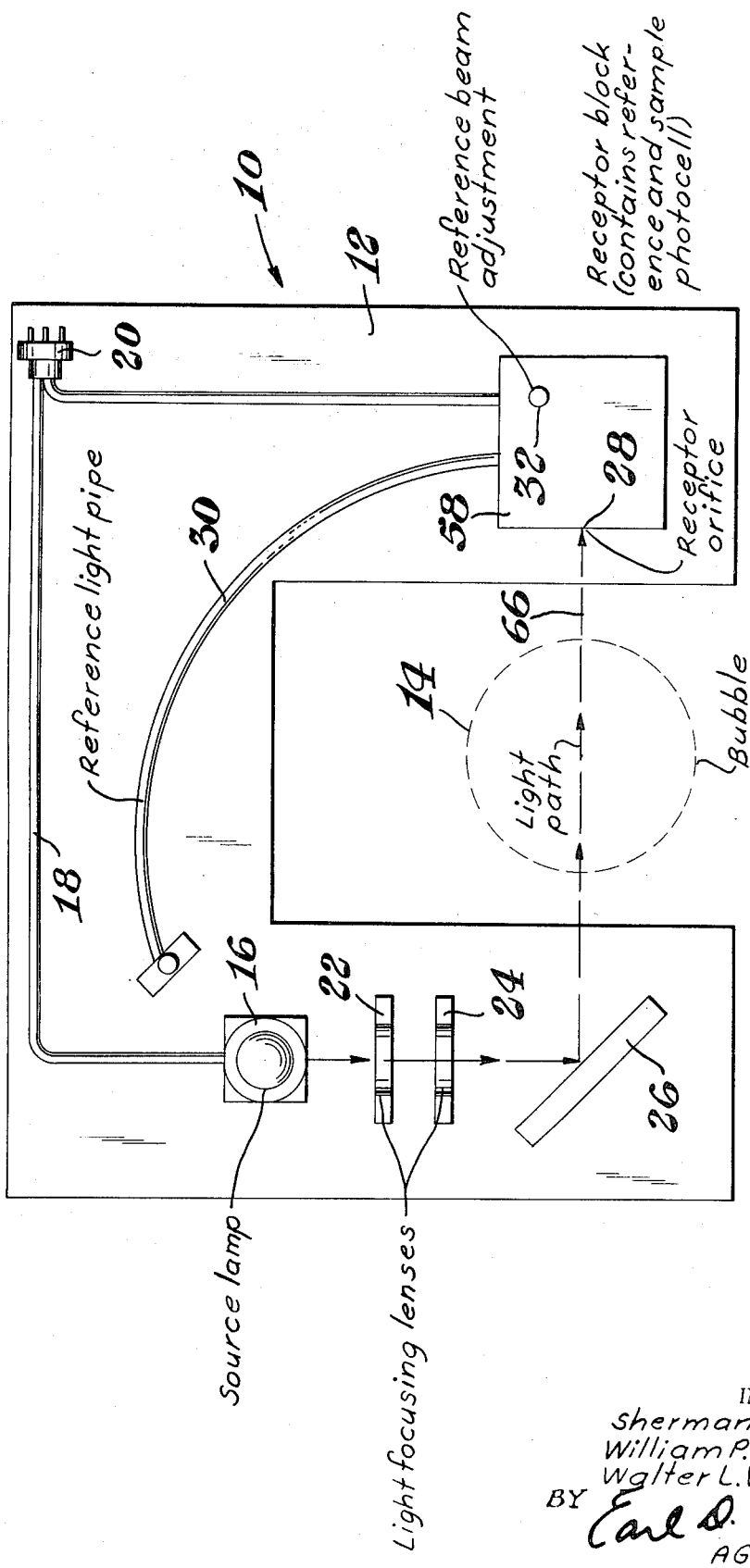
FIG. 1 is a diagrammatical view of apparatus in accordance with this invention.

Referring to the drawings, and particularly to FIG. 1, there is shown optical quality control monitoring apparatus, indicated generally by the numeral 10, including a generally U-shaped base 12 whose leg elements are spaced to fit around a bubble 14, for example, of thin, transparent film.

A light source 16, usually an electric lamp powered by a suitable source (not shown) through cord 18 and plug 20, is mounted on the base 12.

Lenses 22 and 24 are disposed between the light source 16 and a mirror 26. The lenses 22, 24 are aligned and positioned to focus light from the source 16 onto the mirror 26, which is disposed at an angle whereby the light is reflected across the leg elements of the base 12, passing through the film bubble 14.

A housing 58 on the leg element opposite the leg element containing the mirror 26 has a fixed light receptor orifice therein for admitting the light beam 60 which has been reflected from the mirror 26 and passed through the bubble 14.

Figure 3:
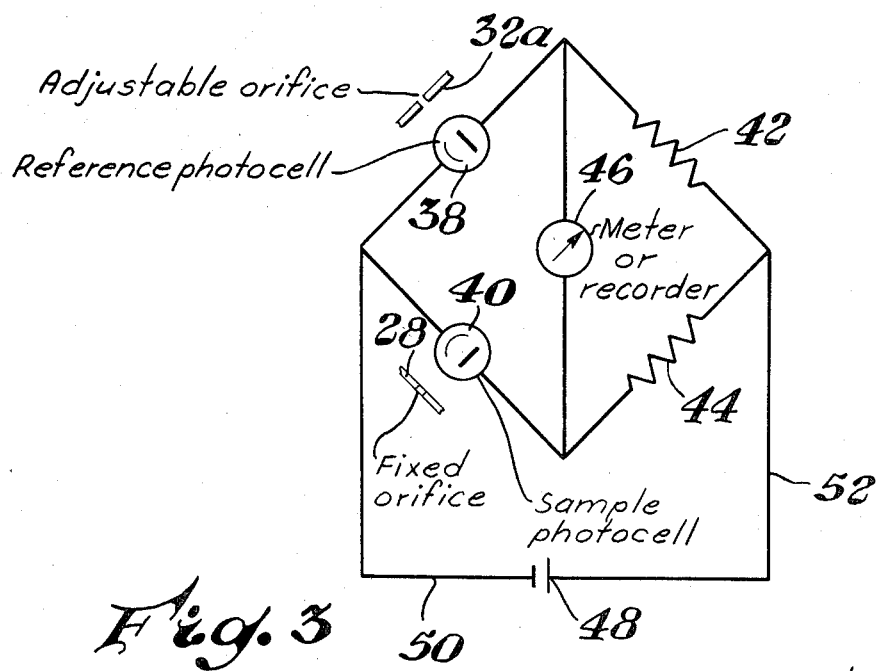
FIG. 3 is a diagrammatic and schematic view of the electrical bridge and associated light entry slits as used in the apparatus of FIG. 1.

Light from the source 16 also enters the housing 58 through a reference light pipe 30 (a "Lucite" rod, for example) and, as shown in FIG. 3, an adjustable orifice 32a which is controlled by a reference beam adjustment element 32 extending through the top of the housing 58.

A bridge circuit containing photo-resistive elements 38, 40 and resistances 42, 44 as the four legs thereof, is disposed within the housing 12. The reference light beam passes through the adjustable orifice 32a and impinges on photocell 38. The sample light beam 66 passes through the fixed orifice 28 and impinges on the photocell 40. A suitable voltage source 48 is coupled by means of leads 50, 52 across one diagonal of the bridge while a meter or other readout device 46 is coupled across the other diagonal of the bridge. The readout device may be, as shown in FIG. 2, a remotely disposed recorder 36 coupled to the apparatus on the base 12 through a control box 34 and suitable cables.

Figure 2:
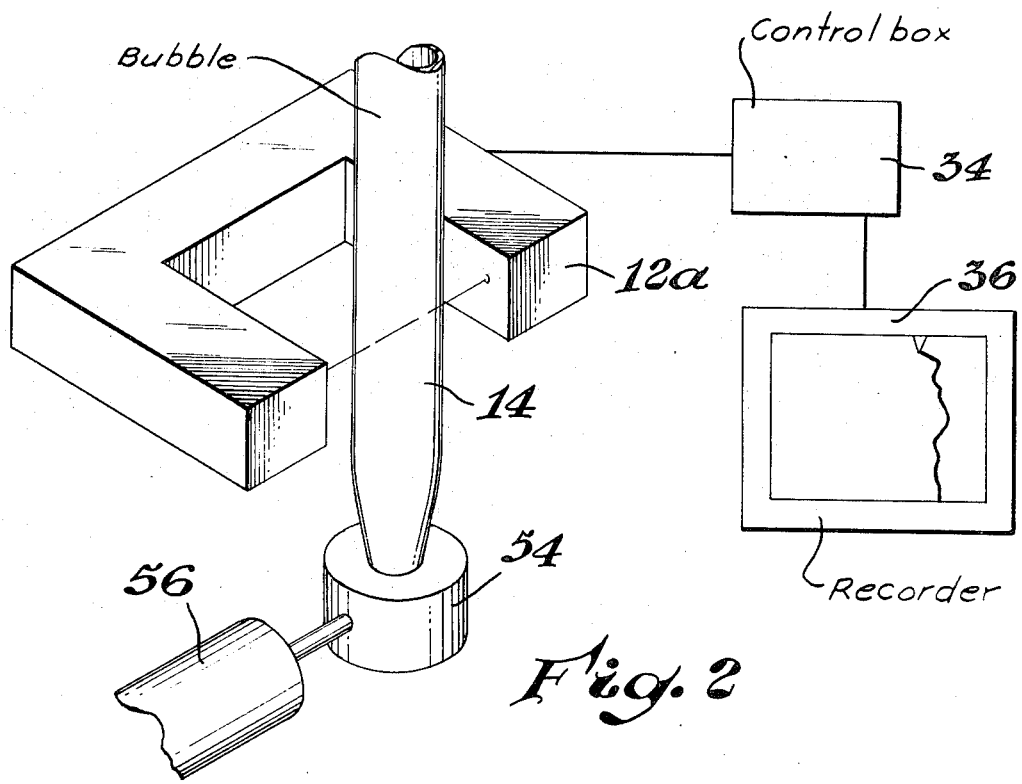
FIG. 2 is an isometric view showing the apparatus of the invention disposed around a bubble of thin, transparent film.

As shown in FIG. 2, the base 12 is covered by a housing 12a which is light tight except for apertures permitting the sample beam to travel from the mirror to the receptor orifice.

In operation, the plastic material is passed from an extruder 56 through die 54 to form the bubble 14 of thin, essentially transparent film which passes through the path of the light beam 60.

The bridge circuit should be balanced to zero output for 100 per cent transmittance with about 6 volts DC applied across the bridge. Maximum output of the bridge should be obtained with the receptor orifice blocked. The output may be utilized in any appropriate manner and will be directly proportional to the Gardner 45° gloss (ASTMD–2457–65T) and other optical properties of a continuous film material passed between the source and receptor elements.

The apparatus operates on the proven premise that a measurement of transmitted light over a very narrow acceptance angle can be related to the specular gloss of a transparent film specimen. The instrument will operate on both cast or tubular films though the calibration curves are different for the two types.

As the product passes through the optical path, any local differences in the film will result in a deviation of the incident beam intensity from the level appropriate to the thickness, refractive index and surface properties of the foregoing location. The reference beam 30 is employed to make the output from a photocell bridge a true measure of optical differences.

A satisfactory output will be obtained if a stable 10 watt light source is used with a standard photocell bridge, and acceptance angle of $<1.0°$ and Clairex CL 603A cells as the photocells 38, 40.

What is claimed is:

1. Continuous optical quality control apparatus, comprising a base structure so shaped that it may be disposed on opposite sides of a thin, transparent film which is to be tested, a light source, reflecting means disposed on one side of said base member, means for focusing light from said source onto said reflecting means, said reflecting means being positioned to reflect said light towards another side of said base structure and across said film to be tested, a bridge circuit having a photocell in each of two arms thereof, said circuit being enclosed in a generally light tight housing which has a receptor orifice aligned with said reflected light and one of said photocells, the field of view of said receptor orifice being restricted to an angle of less than one degree, means for directing light from said source to said other photocell in a path remote from said film, means for maintaining a predetermined relationship between the amount of light impinging on said other photocell and the light passing through said receptor orifice with no film in the path of said reflected light, and means for deriving a readout signal from said bridge circuit which is a function of the difference in transmitted light impinging on said photocells.

2. Apparatus in accordance with claim 1, wherein said means for maintaining said predetermined relationship comprises an adjustable orifice.

3. Apparatus in accordance with claim 1, wherein said means for deriving a readout signal comprises a meter connected across said bridge circuit.

4. Apparatus in accordance with claim 1, wherein said means for deriving a readout signal comprises a recorder connected across said bridge circuit.

5. Apparatus in accordance with claim 1, wherein said apparatus is enclosed in a light tight housing except for the light path between said reflecting means and said receptor orifice.

6. Apparatus in accordance with claim 2 wherein said adjustable orifice restricts the field of view of said photocell to an angle of less than one degree.

7. Continuous optical quality control apparatus, comprising, on opposide sides of an essentially transparent plastic film, a light source and a photocell enclosed in a generally light tight housing with a receptor orifice aligned with the beam of light and photocell, said orifice being so fashioned that the field of view of said photocell is restricted to an angle of less than one degree, and means for deriving a readout signal from said photocell which is calibrated to be proportional to the gloss of said plastic film.

* * * * *